US012770290B2

(12) United States Patent
Gloor

(10) Patent No.: US 12,770,290 B2
(45) Date of Patent: Oct. 20, 2026

(54) METHOD FOR COMPUTING THE POSE OF A MEASURING DEVICE IN THE REFERENCE SYSTEM OF A GEOMETRY MODEL

(71) Applicant: Hilti Aktiengesellschaft, Schaan (LI)

(72) Inventor: Thomas Gloor, Triesen (LI)

(73) Assignee: Hilti Corporation, Schaan (LI)

( * ) Notice: Subject to any disclaimer, the term of this patent is extended or adjusted under 35 U.S.C. 154(b) by 288 days.

(21) Appl. No.: 18/716,422

(22) PCT Filed: Dec. 22, 2022

(86) PCT No.: PCT/EP2022/087582
§ 371 (c)(1),
(2) Date: Jun. 4, 2024

(87) PCT Pub. No.: WO2023/118488
PCT Pub. Date: Jun. 29, 2023

(65) Prior Publication Data
US 2026/0170682 A1 Jun. 18, 2026

(30) Foreign Application Priority Data
Dec. 23, 2021 (EP) .................................... 21217406

(51) Int. Cl.
*G06T 7/73* (2017.01)
*G06T 7/20* (2017.01)
*G06T 7/70* (2017.01)

(52) U.S. Cl.
CPC .................. *G06T 7/74* (2017.01); *G06T 7/20* (2013.01); *G06T 7/70* (2017.01); *G06T 7/73* (2017.01); *G06T 7/75* (2017.01)

(58) Field of Classification Search
None
See application file for complete search history.

(56) References Cited

U.S. PATENT DOCUMENTS 9,506,753 B2 11/2016 Lippuner et al.
12,475,585 B2 * 11/2025 Chang et al. ........... G06T 7/593
(Continued)

FOREIGN PATENT DOCUMENTS

EP 3 867 600 B1 8/2021
EP 3 872 452 A1 9/2021
JP 2013-538347 A 10/2013

OTHER PUBLICATIONS

Klug et al., "Semi-Automatic Registration of a Robotic Total Station and a CAD Model Without Control Points", IECON 2018, Oct. 21-23, 2018, pp. 1-8.*
(Continued)

*Primary Examiner* — John E Breene
(74) *Attorney, Agent, or Firm* — Crowell & Moring LLP

(57) ABSTRACT

A method for computing the pose of a measuring device, which is set up in a measuring environment having multiple delimitation surfaces and which includes a distance measuring unit having a measuring beam and at least one angle measuring unit, in the reference system of a geometry model, which maps at least the delimitation surfaces of the measuring environment, by a microcontroller, which has a communicating connection to the measuring device and which includes an algorithm for computing the pose.

14 Claims, 8 Drawing Sheets

(56) References Cited

U.S. PATENT DOCUMENTS

| | | | |
|---|---|---|---|
| 2014/0198207 A1 | 7/2014 | Lippuner et al. |
| 2021/0381830 A1 | 12/2021 | Gloor et al. |
| 2023/0358536 A1 | 11/2023 | Gloor et al. |

OTHER PUBLICATIONS

International Search Report (PCT/ISA/210) issued in PCT Application No. PCT/EP2022/087582 dated Apr. 11, 2023 (2 pages).

* cited by examiner

METHOD FOR COMPUTING THE POSE OF A MEASURING DEVICE IN THE REFERENCE SYSTEM OF A GEOMETRY MODEL

BACKGROUND AND SUMMARY OF THE INVENTION

The invention relates to a method for computing the pose of a measuring device in the reference system of a geometry model.

Total stations are measuring devices, which have angle and distance measuring units and which execute angle and distance measurements. The angle and distance measured values are measured in the reference system of the total station and still have to be linked to an external reference system for an absolute determination of position.

In known methods for computing the pose of a measuring device in an external reference system, target objects are positioned at known control points and the coordinates of the control points are measured in the reference system of the measuring device. Since the coordinates of the control points in the external reference system are known, the position and orientation (pose) of the measuring device can be computed with the aid of the coordinates of the control points in the external reference system and in the reference system of the measuring device.

The computation of the pose of a measuring device with the aid of known control points has the disadvantage that target objects have to be positioned at the control points.

The object of the present invention is to simplify the computation of the pose of a measuring device in the reference system of a geometry model in such a way that the computation of the pose is possible without control points.

The method for computing the pose of a measuring device, which is set up in a measuring environment having multiple delimitation surfaces and which has a distance measuring unit having a measuring beam and an angle measuring unit, in the reference system of a geometry model, which depicts at least the delimitation surfaces of the measuring environment, by means of a microcontroller, which has a communicating connection with the measuring device and has an algorithm for computing the pose, comprises the following steps according to the invention:

creating a polyline from the geometry model, wherein the polyline represents the horizontal course of the delimitation surfaces perpendicular to the direction of gravity and comprises at least three line sections, executing N, N≥4 measurements using the measuring device in N different orientations of the measuring device, wherein the measuring beam of the distance measuring unit is incident in the N different orientations on at least two different delimitation surfaces and defines N measurement points and in each of the N orientations of the measuring device, a horizontal angle and a horizontal distance are determined between the respective measurement point and the measuring device as measured values, and executing the algorithm to compute the pose, wherein the algorithm comprises a sequence of at least three steps and the steps are selected from a first step, second step, third step, fourth step, fifth step, and sixth step, and (1) in the first step three measurement points of the N measurement points and three line sections of the polyline are selected and for the case in which no assignment between measurement points and line sections was carried out before the start of the algorithm, the selected three measurement points and selected three line sections are assigned to one another, (2) in the second step by means of the measured values of the selected three measurement points and the coordinates of the selected three line sections, the number of the possible solutions for the pose of the measuring device is determined and for the case that one solution or two solutions exist, the measurement coordinates of at least two of the selected three measurement points are determined in the reference system of the geometry model, (3) in the third step for the case that in the second step of the sequence no solution was determined, the method is continued with the sixth step of the sequence, for the case that in the second step of the sequence a solution was determined, an intermediate pose for the measuring device is computed from the measurement coordinates and measured values, those measurement points of the N measurement points which meet a specified quality criterion are determined as qualified measurement points, and the method is continued with the fifth step of the sequence, for the case that in the second step of the sequence two solutions were determined, a first test pose and second test pose are computed from the measurement coordinates and measured values, for the first test pose and second test pose in each case those measurement points of the N measurement points which meet a specified quality criterion are determined as first qualified measurement points or second qualified measurement points, respectively, and the method is continued with the fourth step of the sequence, (4) in the fourth step the first test pose and second test pose are compared with respect to their suitability on the basis of a specified comparison criterion, wherein for the case that one of the first test pose and second test pose is assessed as better suitable, this test pose is defined as the intermediate pose and the method is continued with the fifth step of the sequence, and for the case that neither the first test pose nor second test pose is assessed as better suitable, the method is continued with the sixth step of the sequence, (5) it is checked in the fifth step whether a pose is stored for the measuring device, wherein:

for the case that no pose is stored for the measuring device, the intermediate pose which was determined in the third step or fourth step of the sequence is defined as the pose for the measuring device or an updated pose is computed with the aid of the qualified measurement points and defined as the pose for the measuring device and the method is continued with the sixth step of the sequence, and for the case that a pose is stored for the measuring device, the intermediate pose which was determined in the third step or fourth step of the sequence is compared on the basis of a specified further comparison criterion to the stored pose, wherein for the case that the intermediate pose is assessed as better suitable, the intermediate pose is defined as the pose or an updated pose is computed with the aid of the qualified measurement points and defined as the pose for the measuring device and the method is continued with the sixth step of the sequence, and for the case that the intermediate pose is assessed as not better suitable, the method is continued with the sixth step of the sequence, and (6) in the sixth step it is decided on the basis of a specified termination criterion whether a further sequence is carried out, wherein for the case that a further sequence is carried out, the method is continued with the first step of the sequence, for the case that no further sequence is carried out and a pose is defined for the measuring device, the method is ended, and for the case that no further sequence is carried out and no pose is defined for the measuring device, the method is terminated without a pose having been computed for the measuring device.

Carrying out the method according to the invention for computing the pose of the measuring device in the reference system of the geometry model is controlled by the microcontroller. The microcontroller has a communicating connection with the measuring device via a communication link and has an algorithm for computing the pose of the measuring device. The measuring device is set up in a measuring environment, which has multiple delimitation surfaces, and has a distance measuring unit having a measuring beam and at least one angle measuring unit.

At the beginning of the method according to the invention, a polyline, which represents the horizontal course of the delimitation surfaces perpendicular to the direction of gravity and which comprises at least three line sections, is created from the geometry model.

In a further step of the method according to the invention, at least four different measurements are executed using the measuring device in various orientations, wherein the measuring beam is incident on at least two different delimitation surfaces of the measuring environment and defines a measurement point in each orientation. A horizontal angle and a horizontal distance between the measurement point and the measuring device are determined as measured values for each measurement point. The accuracy or quality with which the pose of the measuring device can be determined can be increased with increasing number of measurement points and with increasing number of delimitation surfaces, which are used for the measurements.

In the next step of the method according to the invention, the algorithm for computing the pose of the measuring device is executed. The algorithm comprises a sequence of at least three steps, which are selected from a first, second, third, fourth, fifth, and sixth step; the sequence can be executed once or multiple times.

In the first step of the sequence, three measurement points of the N measurement points and three line sections of the polyline are selected and for the case in which no assignment between measurement points and line sections was carried out before the start of the algorithm, the selected three measurement points and selected three line sections are assigned to one another.

In the second step of the sequence, the number of the possible solutions for the pose of the measuring device is determined by means of the measured values of the selected three measurement points and the coordinates of the selected three line sections. For the case that one solution or two solutions exist, the measurement coordinates of at least two of the selected three measurement points are determined in the reference system of the geometry model.

In the third step of the sequence, three cases are distinguished in dependence on the number of the solutions which were determined in the second step of the sequence: No solution (zero), one solution (one), or two solutions (two):

for the case that in the second step of the sequence no solution was determined, the method according to the invention is continued with the sixth step of the sequence, for the case that in the second step of the sequence one solution was determined, an intermediate pose for the measuring device is computed from the measurement coordinates and measured values, those measurement points of the N measurement points which meet a specified quality criterion are determined as qualified measurement points, and the method according to the invention is continued with the fifth step of the sequence, for the case that in the second step of the sequence two solutions were determined, a first test pose (first solution) and second test pose (second solution) are computed from the measurement coordinates and measured values, for the first test pose and second test pose in each case those measurement points of the N measurement points which meet a specified quality criterion are determined as first qualified measurement points or second qualified measurement points, respectively, and the method according to the invention is continued with the fourth step of the sequence.

The fourth step of the sequence is only carried out if two solutions were determined in the second step of the sequence. The two solutions, which are designated as first test pose and second test pose, have to be compared to one another. In the fourth step of the sequence, the first test pose and second test pose are compared by the microcontroller on the basis of a specified comparison criterion with respect to their suitability, wherein two cases are distinguished. For the case that one of the first test pose and second test pose is assessed as better suitable, this test pose is defined as the intermediate pose and the method according to the invention is continued with the fifth step of the sequence. For the case that neither the first test pose nor second test pose is assessed is better suitable, the method according to the invention is continued with the sixth step of the sequence.

The fifth step of the sequence is used to further process the intermediate pose which was determined in the third step or fourth step of the sequence. In the fifth step of the sequence, two cases are distinguished:

for the case that in the scope of the method according to the invention no pose is stored for the measuring device, the intermediate pose is defined as the pose for the measuring device or an updated pose is computed with the aid of the qualified measurement points and defined as the pose for the measuring device, for the case that in the scope of the method according to the invention a pose is stored for the measuring device, the intermediate pose is compared on the basis of a specified further comparison criterion to the stored pose. If the intermediate pose is assessed as better suitable, the intermediate pose is defined as the pose or an updated pose is computed with the aid of the qualified measurement points and defined as the pose for the measuring device; the method according to the invention is continued with the sixth step of the sequence. If the intermediate pose is assessed as not better suitable, the method according to the invention is continued with the sixth step of the sequence.

In the sixth step of the sequence, it is decided on the basis of a specified termination criterion whether a further sequence of the first to sixth steps is carried out, wherein three cases are distinguished. For the case that a further sequence is carried out, the method according to the invention is continued with the first step of the sequence. For the case that no further sequence is carried out and a pose is defined for the measuring device, the method according to the invention is ended. For the case that no further sequence is carried out and no pose is defined for the measuring device, the method according to the invention is terminated without a pose having been determined for the measuring device.

Preferably, at least one of the following criteria is used in the third step of the sequence as a quality criterion: Maximum distance of the measurement point to the polyline, unique assignment of the measurement point to a line section of the polyline, and maximum angle of incidence of the measuring beam to the line section of the polyline. A measurement point is designated in the third step as a qualified measurement point if the distance to the polyline is less than a maximum distance and/or the measurement point can be uniquely assigned to a line section of the polyline and/or the angle of incidence of the measuring beam to the assigned line section is less than a maximum angle of incidence, wherein the angle of incidence is measured in relation to the normal vector of the assigned delimitation surface.

Preferably, at least one of the following criteria is used in the fourth step of the sequence as a comparison criterion: Number of the qualified measurement points, distribution of the qualified measurement points along the polyline, surface area of the surface spanned by the qualified measurement points, and estimated accuracy of a test pose. A test pose is assessed as better suitable in the fourth step if its number of the qualified measurement points is greater and/or its qualified measurement points are distributed over more line sections of the polyline and/or the surface area of the surface spanned by its qualified measurement points is greater and/or its estimated accuracy is greater.

Preferably, at least one of the following criteria is used in the fifth step of the sequence as a further comparison criterion: Number of the qualified measurement points, distribution of the qualified measurement points along the polyline, surface area of the surface spanned by the qualified measurement points, and estimated accuracy of a pose. The intermediate pose is assessed as better suitable in the fifth step if its number of the qualified measurement points is greater and/or its qualified measurement points are distributed over more line sections of the polyline and/or the surface area of the surface spanned by its qualified measurement points is greater and/or its estimated accuracy is greater.

Preferably, at least one of the following criteria is used in the sixth step of the sequence as a termination criterion: Minimum number M of sequences, minimum number of qualified measurement points, percentage minimum value of the number of the qualified measurement points in relation to the number of the measurement points, absolute minimum value for the surface area of the surface spanned by the qualified measurement points, and a percentage minimum value of the surface area of the surface spanned by the qualified measurement points in relation to the surface area of the polygon which is enclosed by the polygon line.

The sequence is ended when a minimum number M of sequences is reached and/or the number of the qualified measurement points is greater than a minimum number and/or the ratio between the number of the qualified measurement points and the number of the measurement points is greater than a percentage minimum value and/or the surface area of the surface spanned by the qualified measurement points is greater than an absolute minimum value and/or the ratio between the surface area of the surface spanned by the qualified measurement points and the surface area of the polygon is greater than a percentage minimum value.

Impermissible measuring areas are preferably defined during the creation of the polyline, wherein the line sections of the polyline assigned to the impermissible measuring areas are defined as impermissible line sections and are excluded from the selection of the three line sections in the first step of the sequence.

At least one of the following measuring areas is particularly preferably defined as an impermissible measuring area: Window opening, door opening, glass pane, area in which the geometry model deviates from the measuring environment, and area which is inaccessible or unsuitable for the measurement.

The assignment to a line section which is different from an impermissible line section is particularly preferably used in the third step of the sequence as a quality criterion.

In a first preferred variant, the N measurements are executed using the measuring device manually by an operator and the measurement points are assigned by the operator to the line sections of the polyline. The first variant is designated as a manual variant, in which the measurements and the assignment are carried out by the operator.

In a second preferred variant, the N measurements are executed using the measuring device by the microcontroller and the measurement points are assigned by the operator to the line sections of the polyline. The second variant is designated as a semi-manual variant, in which the measurements are carried out automatically and the assignment is carried out by the operator.

In a third preferred variant, the N measurements are executed using the measuring device manually by an operator and the assignment to be performed in the first step of the sequence is performed by the microcontroller randomly or with the aid of a selection criterion. The third variant is referred to as a semi-automatic variant, in which the measurements are carried out by the operator and the assignment is carried out by the microcontroller.

In a fourth preferred variant, the N measurements are executed using the measuring device by the microcontroller and the assignment to be performed in the first step of the sequence is performed by the microcontroller randomly or with the aid of a selection criterion. The fourth variant is designated as a fully automatic variant, in which the measurements and the assignment are executed by the microcontroller.

At least one of the following criteria is particularly preferably used as a selection criterion: Sequence of the line sections in the rotational direction of the measuring device, length of the line sections, and distances of the measurement points to the polyline, wherein the distances are computed with the aid of the measured values and a starting pose for the measuring device.

The measuring device particularly preferably has a camera unit and a camera image is created by the camera unit in each of the N orientations of the measuring device, wherein the camera image is assigned to the respective orientation of the measuring device.

Exemplary embodiments of the invention are described hereinafter with reference to the drawings. It is not necessarily intended for the drawings to illustrate the exemplary embodiments to scale; rather, the drawings are produced in a schematic and/or slightly distorted form where this is useful for the purposes of explanation. It should be taken into account here that various modifications and variations relating to the form and detail of an embodiment may be undertaken without departing from the general concept of the invention. The general concept of the invention is not limited to the exact form or the detail of the preferred embodiment shown and described hereinafter or limited to subject matter that would be limited compared with the subject matter claimed in the claims. For given dimensioning ranges, values within the stated limits should also be disclosed as limit values and can be used and claimed as desired. For the sake of simplicity, the same reference numerals are used below for identical or similar parts or parts with identical or similar functions.

DETAILED DESCRIPTION OF THE DRAWINGS

Figure 1:
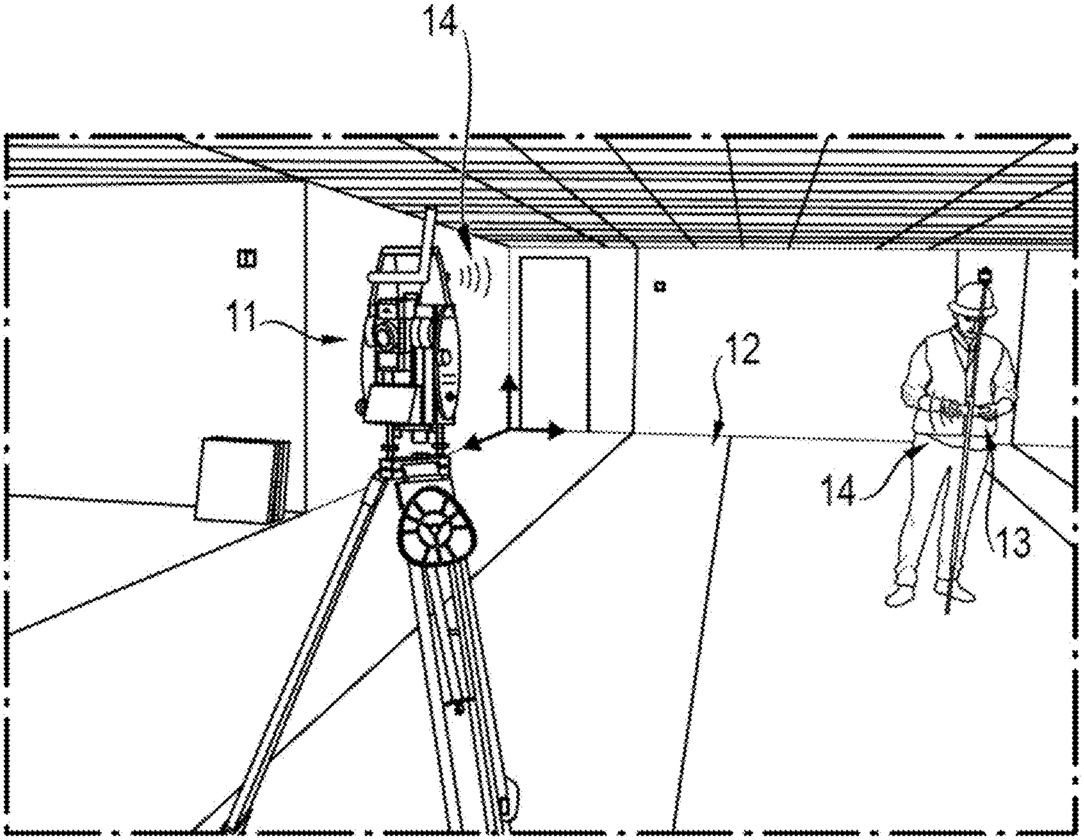
FIG. 1 shows a measuring device, which is set up in a measuring environment and is connected via a communication link to an operating controller.

FIG. 1 shows a measuring device 11, the position and orientation (pose) of which in a measuring environment 12 are to be determined with the aid of a method according to the invention, and an operating controller 13. “Measuring device” is a collective term for all devices intended for carrying out measurement tasks. The measuring device 11, which in the exemplary embodiment is designed as a total station, can be connected to the operating controller 13 via a communication link 14.

The measuring environment 12 is mapped in a geometry model. A construction model of the measuring environment 12 produced with CAD support can be used as the geometry model. Alternatively, the measuring environment 12 can be scanned by means of a laser scanner and a geometry model of the measuring environment 12 can be created from the scan data. The geometry model can map the measuring environment 12 completely or only partially. The surfaces of the measuring environment 12 that are used as a reflection surface or scatter surface for a distance measurement are decisive for the present application.

The pose of the measuring device 11 is computed with the aid of a method according to the invention in the reference system of the geometry model. The method according to the invention uses the measured values of at least four measurement points, which are determined with the aid of the measuring device 11, and the horizontal course of the delimitation surfaces, which is designated as a polyline.

Figure 2A:
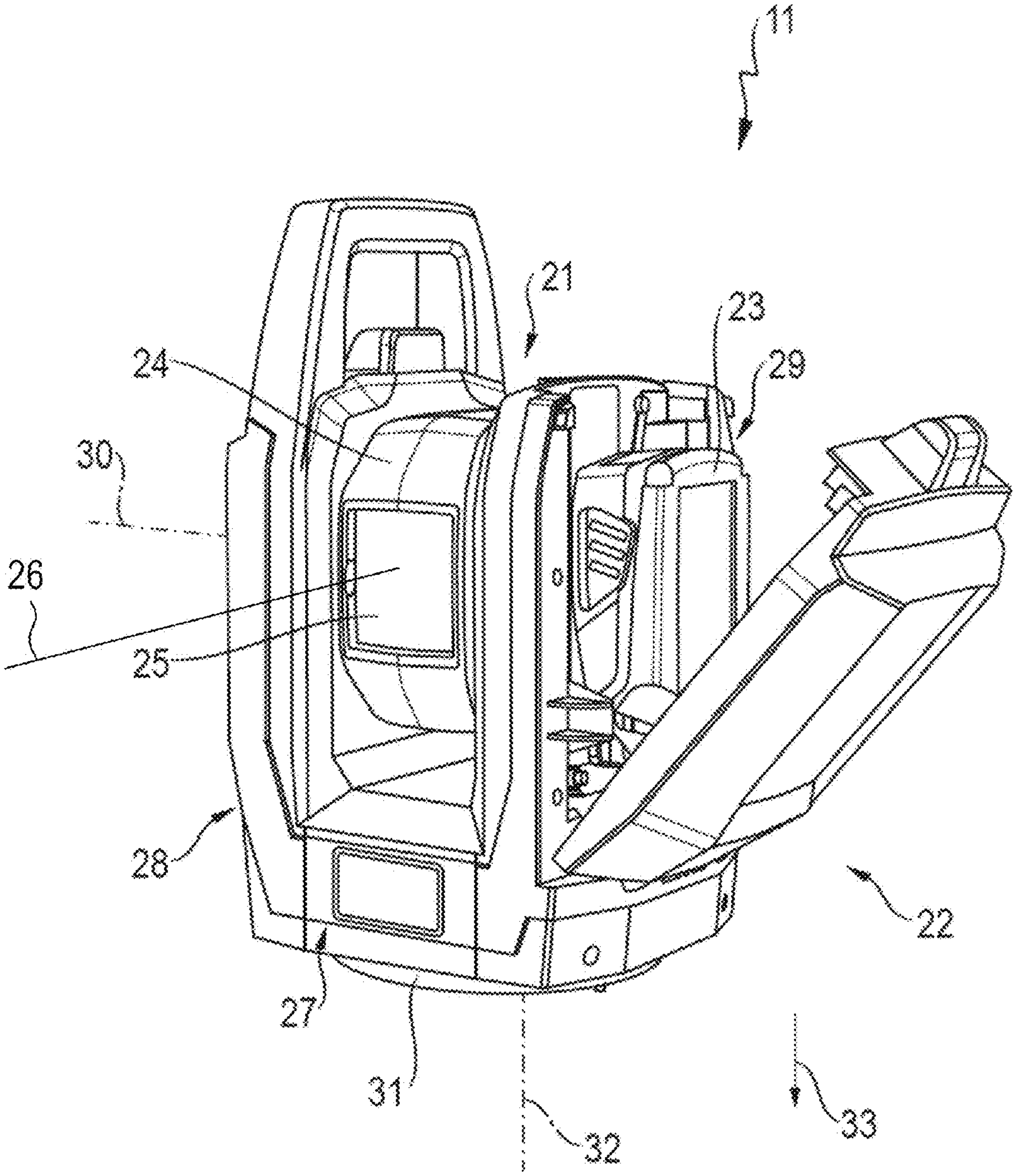
FIG. 2A, B show the measuring device of FIG. 1 in a 3D view (FIG. 2A) and a schematic structure of the measuring device in a block diagram (FIG. 2B)
Figure 2B:
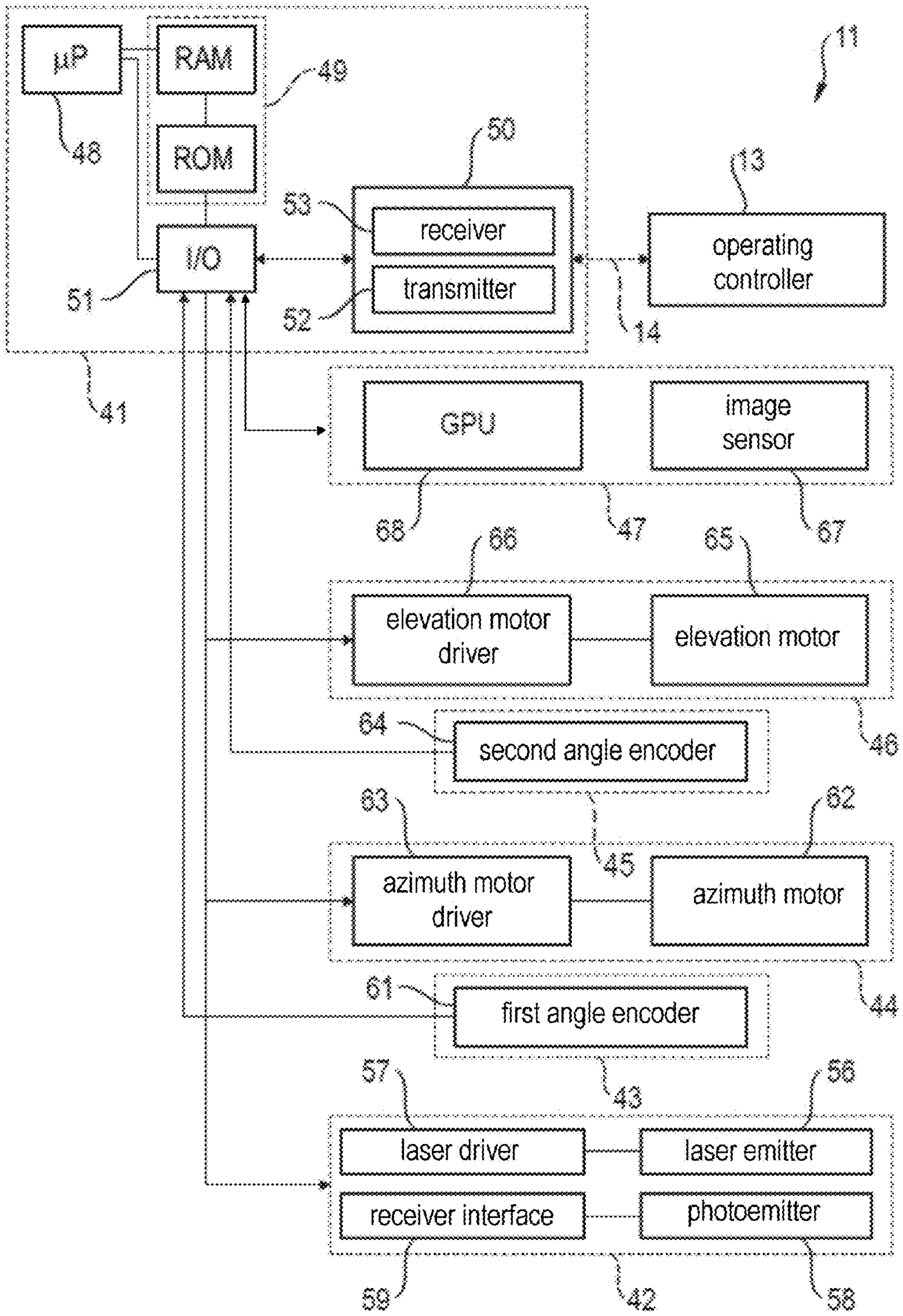

FIG. 2A, B show the measuring device 11 of FIG. 1 in a 3D view (FIG. 2A) and in a schematic structure in the form of a block diagram (FIG. 2B).

The measuring device 11 is designed as a total station and includes a measuring head 21, a main housing 22, and a rechargeable battery 23. The measuring head 21 comprises a housing 24 having an exit window 25 and a distance measuring unit arranged in the housing 24, which emits a measuring beam 26. The measuring beam 26 leaves the housing 24 through the exit window 25 and can generate measurement points on a delimitation surface of the measuring environment.

The main housing 22 is formed U-shaped and comprises a base housing 27, a first side part 28, and a second side part 29. The measuring head 21 is arranged between the first side part 28 and second side part 29 and is made pivotable around a pivot axis 30. The main housing 22 is made rotatable in relation to a rotation platform 31 around an axis of rotation 32.

An azimuth motor unit and a first angle measuring unit are arranged in the base housing 27; the azimuth motor unit enables the main housing 22 to move around the axis of rotation 32, and the first angle measuring unit enables the direction of the measuring beam 26 to be determined in a horizontal plane. An elevation motor unit and a second angle measuring unit are arranged in the first side part 28; the elevation motor unit enables the measuring head 21 to move around the pivot axis 30, and the second angle measuring unit enables the direction of the measuring beam 26 to be determined in a vertical plane. To make the measuring device 11 fully automatic, a leveling unit can be provided in the base housing 27, which enables the measuring device 11 to be leveled so that the axis of rotation 32 extends in parallel to a direction of gravity 33.

FIG. 2B shows the schematic structure of the measuring device 11 as a block diagram. The measuring device 11 includes an electronics unit 41, a distance measuring unit 42, a first angle measuring unit 43 for measuring an azimuth angle, an azimuth motor unit 44, a second angle measuring unit 45 for measuring an elevation angle, an elevation motor unit 46, and a camera unit 47.

The electronics unit 41 comprises a microcontroller 48, a memory circuit 49, which can include a random access memory (RAM) and a read-only memory (ROM), a communication circuit 50, and an I/O interface 51. The microcontroller 48 can communicate with the memory circuit 49 and the communication circuit 50 and is designed for the control and regulation of the measuring device 11.

The communication circuit 50 includes a transmitter 52 and a receiver 53 and is designed for communication and exchange of items of data information, e.g., distance measured values, azimuth angle values, and elevation angle values, with the operating controller 13, typically using a wireless signal. In one preferred embodiment, the communication link 14 is wireless, although a cable could be connected between the communication circuit 50 and the operating controller 13. The I/O interface 51 is an interface between the microcontroller 48 and the various types of drivers and sensors.

The distance measuring unit 42 comprises a laser emitter 56, which generates the measuring beam 26, a laser driver 57, which supplies the laser emitter 56 with current, a photosensor 58, and a receiver interface 59. The photosensor 58 receives at least a part of the measuring beam 26, which is reflected at a delimitation surface, and the current signal output by the photosensor 58 is conducted to the receiver interface 59. After amplification and demodulation, the signal is transmitted from the receiver interface 59 via the I/O interface 51 to the microcontroller 48.

The first angle measuring unit 43 comprises a first angle encoder 61, which determines the direction of the laser emitter 56 in the horizontal plane (azimuth angle) and converts it into an electrical output signal, which is transmitted via the I/O interface 51 to the microcontroller 48. The azimuth motor unit 44 comprises an azimuth motor 62, which moves the main housing 22 of the measuring device 11 around the axis of rotation 32, and an azimuth motor driver 63, which converts the commands of the microcontroller 48 into the required amperages of the azimuth motor 62.

The second angle measuring unit 45 comprises a second angle encoder 64, which determines the direction of the laser emitter 56 in the vertical plane (elevation angle) and converts it into an electrical output signal, which is transmitted via the I/O interface 51 to the microcontroller 48. The elevation motor unit 46 comprises an elevation motor 65, which moves the measuring head 21 around the pivot axis 30, and an elevation motor driver 66, which converts the commands of the microcontroller 48 into the required amperages of the elevation motor 65.

The camera unit 47 comprises an image sensor 67 and a graphics processor (GPU) 68, which is responsible for the computation of items of image information.

Figure 3A:
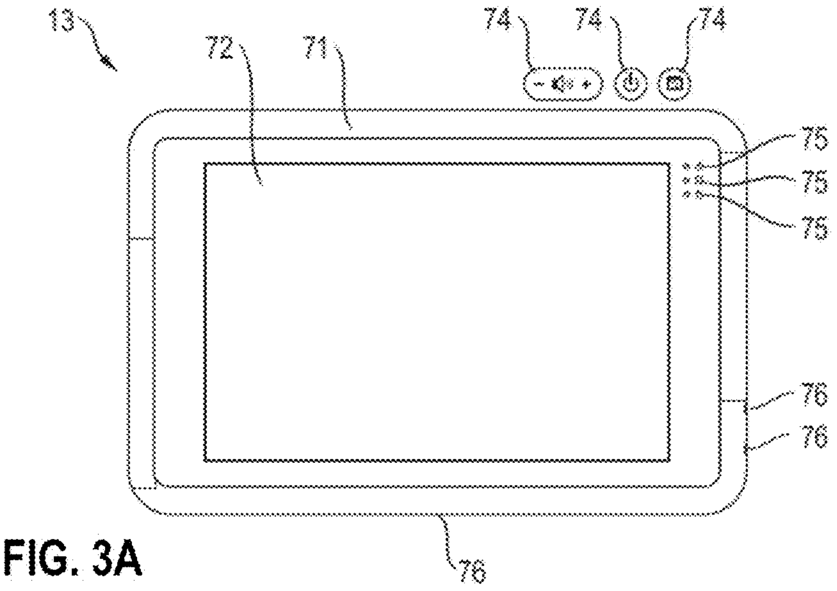
FIG. 3A, B show the operating controller of FIG. 1 in a top view of a front side (FIG. 3A) and a schematic structure of the operating controller in a block diagram (FIG. 3B)
Figure 3B:
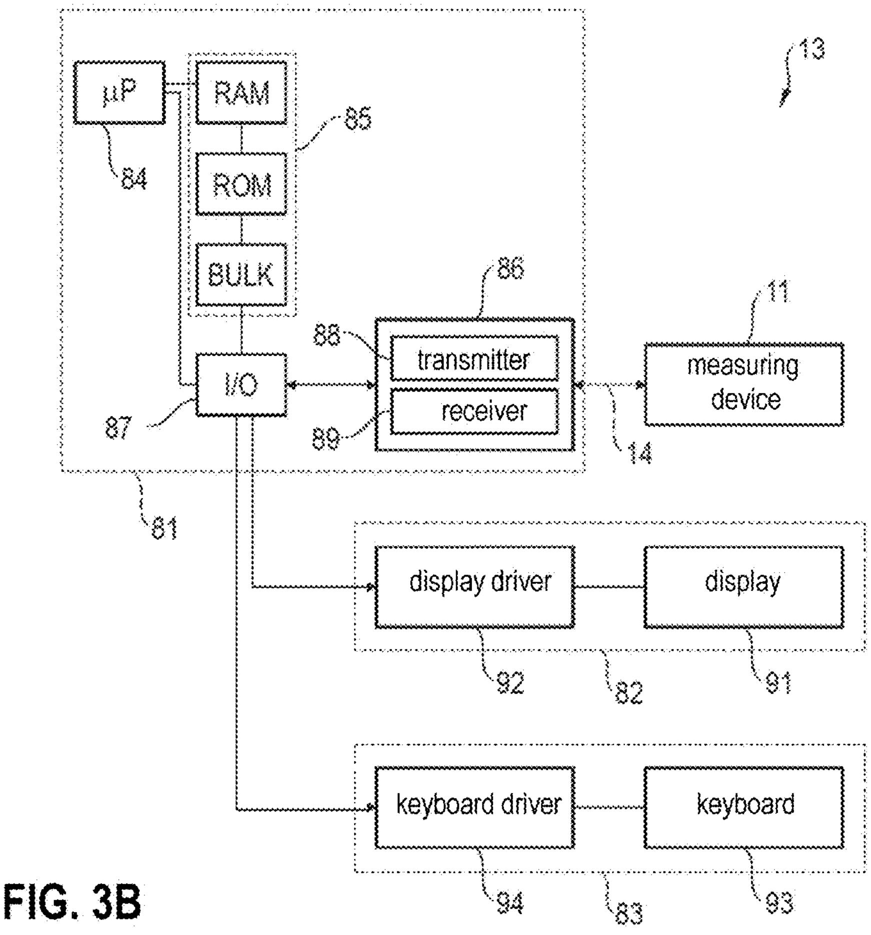

FIG. 3A, B show the operating controller 13 of FIG. 1 in a top view of a front side (FIG. 3A) and a schematic structure of the operating controller 13 in a block diagram (FIG. 3B).

The operating controller 13 is embodied as a tablet computer and comprises a housing 71, a touchscreen 72, a battery 73, multiple buttons 74, e.g., volume control button, on/off button, and display control button, multiple displays 75, e.g., for operating status, data storage status, and battery status, multiple ports 76, e.g., for docking, data storage, and USB, and a card slot 77.

FIG. 3B shows the schematic structure of the operating controller 13 as a block diagram. The operating controller 13 comprises an electronics unit 81, a display unit 82, and a user-actuated input unit 83.

The electronics unit 81 comprises a microcontroller 84, a memory circuit 85, which can comprise a random access memory (RAM), a read-only memory (ROM), and a bulk memory (BULK), a communication circuit 86, and an I/O interface 87. The microcontroller 84 can communicate with the memory circuit 85 and the communication circuit 86 and is designed for the control and regulation of the operating controller 13. The bulk memory could be an SD card, which can be inserted into the card slot 77, or an external storage device, which can be connected via one of the ports 76, for example a USB port, to the operating controller 13.

The communication circuit 86 includes a transmitter 88 and a receiver 89 and is designed for communication with the measuring device 11, typically using a wireless signal. The measuring device 11 transmits distance measured values, azimuth angle values, and elevation angle values via the communication link 14 to the operating controller 13.

The display unit 82 comprises a display 91 and a display driver circuit 92, which is connected to the I/O interface 87 and provides the correct interface and data signals for the display 91. The user-controlled input unit 83 comprises a keyboard 93 and a keyboard driver 94, which is connected to the I/O interface 87 and provides the correct interface and data signals for the keyboard 93.

Figure 4:
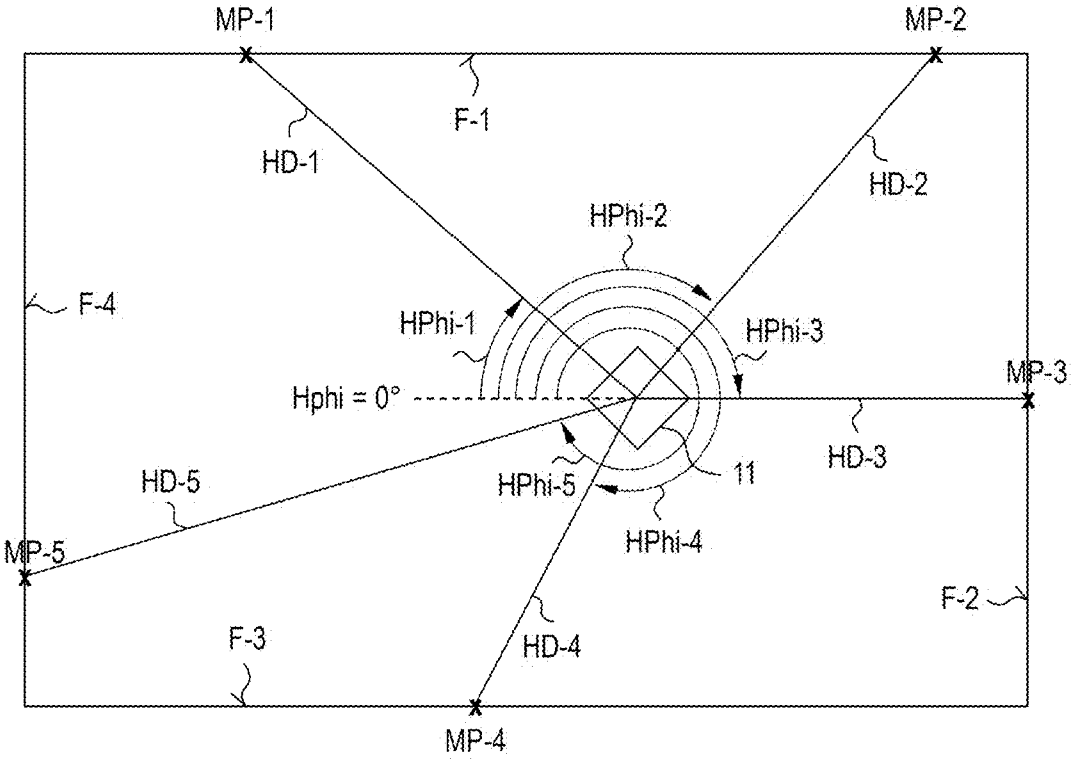
FIG. 4 shows carrying out multiple measurements using the measuring device on various delimitation surfaces of the measuring environment.

FIG. 4 shows carrying out multiple measurements using the measuring device 11 on various delimitation surfaces of the measuring environment 12 in schematic form. The measuring environment 12 has four walls, which form four delimitation surfaces F-1, F-2, F-3, F-4.

The measuring device 11 is oriented in a first orientation and the measuring beam 26 generates a first measurement point MP-1 on the first delimitation surface F-1. Distance and angle values are determined for the first measurement point MP-1 by means of a distance and angle measurement. The method according to the invention requires the distance and angle values in a horizontal plane perpendicular to the direction of gravity 33, which are referred to hereinafter as horizontal distance and horizontal angle.

To obtain the horizontal angle and the horizontal distance, the measuring device 11 can be leveled before beginning the measurement by means of the leveling unit 47, so that the measured distance and angle values correspond to the horizontal angle and the horizontal distance, or the measuring device 11 measures three-dimensional values and derives the horizontal angle and the horizontal distance therefrom. A first horizontal angle HPhi-1 and a first horizontal distance HD-1 are determined as first measured values for the first measurement point MP-1.

The measuring device 11 is offset from the first orientation into a second orientation and the measuring beam 26 is oriented on a second measurement point MP-2, for which a second horizontal angle HPhi-2 and a second horizontal distance HD-2 are determined as second measured values. The measuring device 11 is offset from the second orientation into a third orientation and the measuring beam 26 is oriented on a third measurement point MP-3, for which a third horizontal angle HPhi-3 and a third horizontal distance HD-3 are determined as third measured values. The measuring device 11 is offset from the third orientation into a fourth orientation and the measuring beam 26 is oriented on a fourth measurement point MP-4, for which a fourth horizontal angle HPhi-4 and a fourth horizontal distance HD-4 are determined as fourth measured values.

For the method according to the invention, the measurement points have to be arranged on at least two different delimitation surfaces. In the exemplary embodiment, the first and second measurement point MP-1, MP-2 are on the first delimitation surface F-1, the third measurement point MP-3 is on the second delimitation surface F-2, and the fourth measurement point MP-4 is on the third delimitation surface F-3, so that the four measurement points, MP-1, MP-2, MP-3, MP-4, are arranged on three different delimitation surfaces.

To increase the accuracy with which the pose of the measuring device 11 can be computed, it is advantageous to orient the measurement points on as many delimitation surfaces as possible of the measuring environment 12 and to distribute them as uniformly as possible over the solid angle. For this purpose, the measuring device 11 can be offset into a fifth orientation and the measuring beam 26 can be oriented on a fifth measurement point MP-5, which is on the fourth delimitation surface F-4, and for which a fifth horizontal angle HPhi-5 and a fifth horizontal distance HD-5 are determined as fifth measured values.

Figure 5:
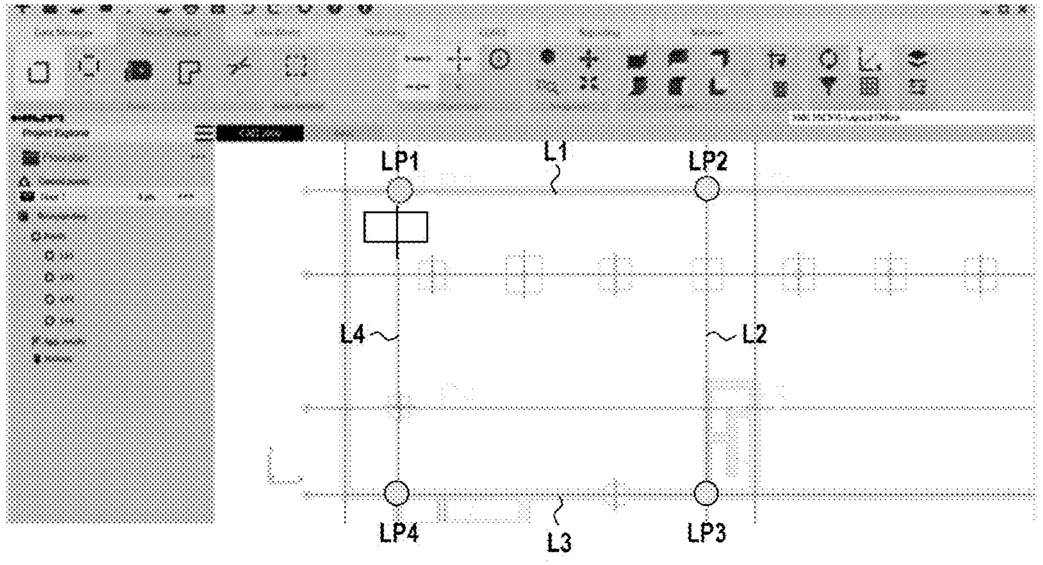
FIG. 5 shows a screenshot of the operating controller, which shows how a polyline is created from the geometry model of the measuring environment.

FIG. 5 shows a screenshot of the operating controller 13, which shows how a polyline is created from the geometry model. The geometry model, which maps the measuring environment 12, is loaded by the microcontroller 84 and a 2D view is displayed on the display 91.

The operator determines a first point LP1, a second point LP2, a third point LP3, and a fourth point LP4, which represent the corner points. The microcontroller 84 defines a line between the first point LP1 and second point LP2 as the first line section L1, a line between the second point LP2 and third point LP3 as the second line section L2, a line between the third point LP3 and fourth point LP4 as the third line section L3, and a line between the fourth point LP4 and first point LP1 as the fourth line section L4. The polyline is formed from the first line section L1, the second line section L2, the third line section L3 and the fourth line section LA.

The first line section L1 represents the horizontal course of the first delimitation surface F-1, the second line section L2 represents the horizontal course of the second delimitation surface F-2, the third line section L3 represents the horizontal course of the third delimitation surface F-3, and the fourth line section LA represents the horizontal course of the fourth delimitation surface F-4.

Figure 6A:
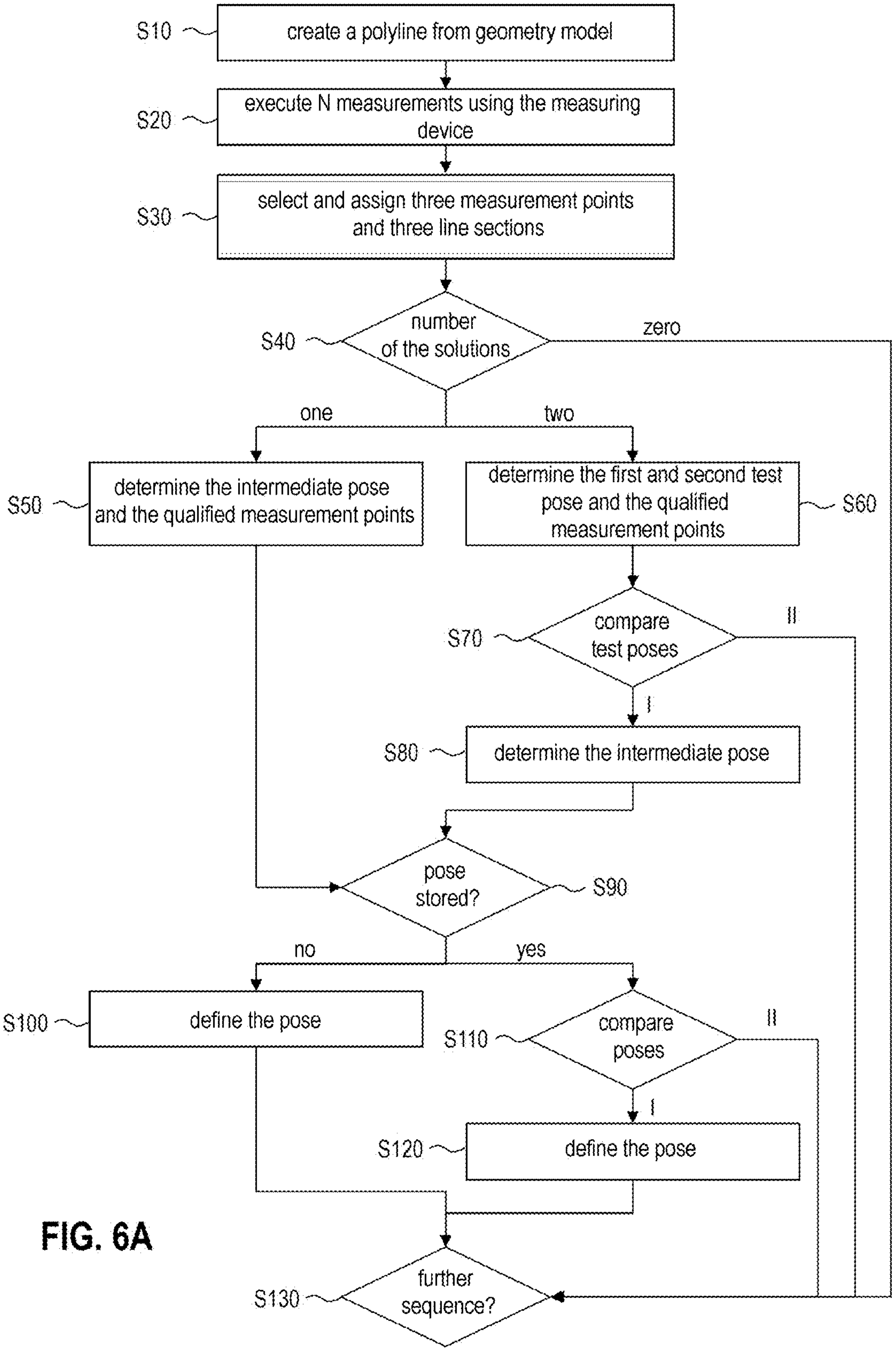
FIG. 6A, B show a method according to the invention for computing the pose of a measuring device in the form of a flow chart.
Figure 6B:
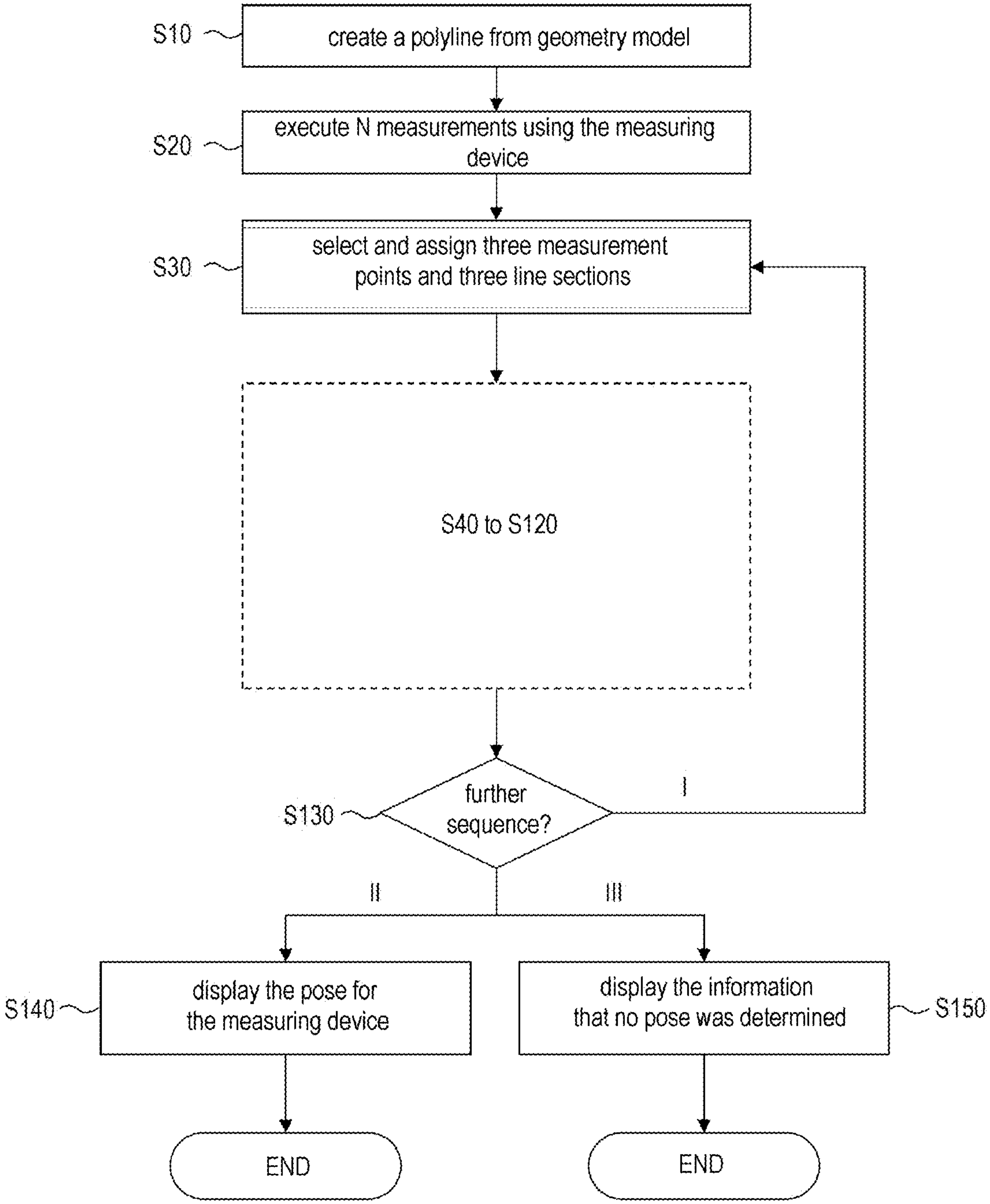

FIG. 6A, B show the method according to the invention for computing the pose of the measuring device in the form of a flow chart. Carrying out the method according to the invention for computing the pose of the measuring device 11 in the reference system of the geometry model is controlled by the microcontroller 84 of the operating controller 13.

The microcontroller 84 has a communicating connection via the communication circuit 86 and the communication link 14 with the measuring device 11 and includes an algorithm for computing the pose of the measuring device 11. To be able to compute the pose of the measuring device 11 with the aid of the algorithm, a polyline has to be created from the geometry model of the measuring environment 12 (see FIG. 5) and at least four different measurements have to be executed using the measuring device 11 (see FIG. 4).

The method according to the invention has the advantage that fixed control points do not have to be used, rather the measuring device 11 can be oriented on all delimitation surfaces of the measuring environment 12. To improve the accuracy of the pose, it is advantageous to orient the measurement points on as many delimitation surfaces as possible of the measuring environment 12 and to distribute them as uniformly as possible over the solid angle.

The operator creates a polyline from the geometry model, which represents the horizontal course of the delimitation surfaces perpendicular to the direction of gravity 33 and comprises at least three line sections (step S10). In the next step of the method according to the invention, N, N≥4 different measurements are executed using the measuring device 11 (step S20).

In the variant of the method according to the invention shown in FIG. 6A, B, firstly the polyline is created and then at least four measurements are executed using the measuring device 11. Alternatively, the measurements can be executed first and then the polyline is created or in the case of an automatic measurement, the two steps can also be executed simultaneously.

The measurements can be executed manually by the user or the microcontroller 84 causes the measurements to be carried out. Each of the N measurements is executed in a different orientation of the measuring device 11. The measuring beam 26 of the distance measuring unit 42 defines a measurement point on one of the delimitation surfaces of the measuring environment 12. The measuring device 11 determines for each measurement point as measured values a horizontal angle and a horizontal distance between the measurement point and the measuring device 11. The N different measurement points have to be arranged so that measuring is carried out on at least two different delimitation surfaces of the measuring environment 12. FIG. 4 shows the five measurement points MP-1, MP-2, MP-3, MP-4, and MP-5, which are arranged on the four delimitation surfaces F-1, F-2, F-3, and F-4.

The method according to the invention is continued by executing the algorithm for computing the pose, wherein the algorithm comprises a sequence of at least three steps and the steps are selected from a first step, second step, third step, fourth step, fifth step, and sixth step.

In the first step of the sequence three measurement points of the N measurement points and three line sections of the polyline are selected and for the case in which no assignment between measurement points and line sections was carried out before the start of the algorithm, the selected three measurement points and selected three line sections are assigned to one another (step S30).

In the second step of the sequence by means of the measured values of the selected three measurement points and the coordinates of the selected three line sections, the number of the possible solutions for the pose of the measuring device 11 is determined (step S40). For the case that one solution or two solutions exist, measurement coordinates of at least two of the selected three measurement points are determined in the reference system of the geometry model. The measurement coordinates are required in the further course of the method for computing an intermediate pose.

The third step of the sequence distinguishes between three cases: No solution, one solution, and two solutions. For the case that in the second step of the sequence no solution was determined (zero in S40), the method according to the invention is continued with the sixth step of the sequence. For the case that in the second step of the sequence one solution was determined (one in S40), an intermediate pose for the measuring device is computed from the measurement coordinates and measured values and those measurement points of the N measurement points which meet a specified quality criterion are determined as qualified measurement points (step S50); the method according to the invention is continued with the fifth step of the sequence. For the case that in the second step of the sequence two solutions were determined (two in S40), a first test pose and second test pose are computed from the measurement coordinates and measured values, and for the first test pose and second test pose in each case those measurement points of the N measurement points which meet a specified quality criterion are determined as first qualified measurement points or second qualified measurement points, respectively (step S60); the method according to the invention is continued with the fourth step of the sequence.

The intermediate pose determined in step S50 represents a pose (position and orientation) of the measuring device 11 which is assessed in the further course of the method according to the invention. The first and second test pose determined in step S60 represent a pose (position and orientation) of the measuring device 11 which are compared to one another in the further course of the method according to the invention. The use of the terms "intermediate pose", "first test pose", and "second test pose" enables a language distinction between the mathematical solutions.

At least one of the following criteria is used as the quality criterion using which the qualified measurement points can be determined in step S50 or step S60: Maximum distance of the measurement point to the polyline, unique assignment of the measurement point to a line section of the polyline, and maximum angle of incidence of the measuring beam to the line section of the polyline. For the case that the polyline contains at least one impermissible line section, the assignment to a line section which is different from an impermissible line section can also be used.

The microcontroller 84 applies the specified quality criterion for each of the N measurement points. A measurement point is designated as a qualified measurement point if the distance to the polyline is less than a maximum distance and/or the measurement point can be assigned uniquely to a line section of the polyline and/or the angle of incidence of the measuring beam to the assigned line section is less than a maximum angle of incidence. The angle of incidence is measured in relation to the normal vector of the delimitation surface.

The fourth step of the sequence is only carried out if two solutions were determined in the second step of the sequence and is used to compare these two solutions, which are designated as the first and second test pose, to one another. In the fourth step of the sequence, the first test pose and second test pose are compared by the microcontroller 84 on the basis of a specified comparison criterion with respect to their suitability (step S70), wherein two cases are distinguished. For the case that one of the first test pose and second test pose is assessed as better suitable (I in S70), this test pose is defined as the intermediate pose (step S80) and the method according to the invention is continued with the fifth step of the sequence. For the case that neither the first test pose nor second test pose is assessed as better suitable (II in S70), the method according to the invention is continued with the sixth step of the sequence.

At least one of the following criteria is used as a comparison criterion, using which the first test pose and second test pose can be compared in step S70: Number of the qualified measurement points, distribution of the qualified measurement points along the polyline, surface area of the surface spanned by the qualified measurement points, and estimated accuracy of a pose.

The microcontroller 84 compares the first test pose (first solution in S50) and the second test pose (second solution in S50) to one another on the basis of the comparison criterion. A test pose is assessed as better suitable if its number of the qualified measurement points is greater and/or its qualified measurement points are distributed over more line sections of the polyline and/or the surface area of the area spanned by its qualified measurement points is larger and/or its estimated accuracy is greater.

In the fifth step of the sequence, it is checked whether a pose is stored for the measuring device (step S90), wherein two cases are distinguished. For the case that no pose is stored for the measuring device (no in S90), the intermediate pose which was determined in the third step (S50) or fourth step (S80) of the sequence is defined as the pose for the measuring device or an updated pose is computed with the aid of the qualified measurement points and defined as the pose for the measuring device (step S100). The computation of an updated pose with the aid of the qualified measurement points has the advantage that all qualified measurement points are taken into consideration, by which the accuracy of the pose can be improved.

For the case that a pose is stored for the measuring device (yes in S90), the intermediate pose which was determined in the third step (S50) or fourth step (S80) of the sequence is compared by the microcontroller 84 on the basis of a specified further comparison criterion to the stored pose (step S110), wherein two cases are distinguished. If the intermediate pose is assessed as better suitable (I in S110), the intermediate pose is defined as the pose or an updated pose is computed with the aid of the qualified measurement points and defined as the pose for the measuring device 11 (step S120), the method according to the invention is continued with the sixth step of the sequence. If the intermediate pose is assessed as not better suitable (II in S110), the method according to the invention is continued with the sixth step of the sequence. The computation of an updated pose with the aid of the qualified measurement points in step S120 has the advantage that all qualified measurement points are taken into consideration, by which the accuracy of the pose can be improved.

At least one of the following criteria is used as a further comparison criterion, using which the intermediate pose and a stored pose can be compared in step S90: Number of the qualified measurement points, distribution of the qualified measurement points along the polyline, surface area of the surface spanned by the qualified measurement points, and estimated accuracy of a pose.

The microcontroller 84 compares the intermediate pose and a stored pose to one another on the basis of the further comparison criterion. The intermediate pose is assessed as better suitable if its number of the qualified measurement points is greater and/or its qualified measurement points are distributed over more line sections of the polyline and/or the surface area of the surface spanned by its qualified measurement points is larger and/or its accuracy is greater.

In the sixth step of the sequence, it is decided on the basis of a specified termination criterion whether a further sequence is carried out (step S130), wherein three cases are distinguished: For the case that a further sequence is carried out (I in S130), the method according to the invention is continued with the first step of the sequence (S30). For the case that no further sequence is carried out and a pose is defined for the measuring device (II in S130), the pose is displayed by the microcontroller 84 (step S140) and the method according to the invention is ended. For the case that no further sequence is carried out and no pose is defined for the measuring device (III in S130), the information is displayed by the microcontroller 84 that no pose has been determined for the measuring device (step S150), and the method according to the invention is ended.

At least one of the following criteria is used as the termination criterion: Minimum number M of sequences, minimum number of qualified measurement points, percentage minimum value of the number of the qualified measurement points in relation to the number of the measurement points, absolute minimum value for the surface area of the surface spanned by the qualified measurement points, and a percentage minimum value of the surface area of the surface spanned by the qualified measurement points in relation to the surface area of the polygon which is enclosed by the polygon line.

The microcontroller 84 applies the termination criterion and ends the execution of the sequences when a minimum number M of sequences is reached and/or the number of the qualified measurement points is greater than a minimum number and/or the ratio between the number of the qualified measurement points and the number of the measurement points is greater than a percentage minimum value and/or the surface area of the surface spanned by the qualified measurement points is greater than an absolute minimum value and/or the ratio between the surface area of the surface spanned by the qualified measurement points and the surface area of the polygon is greater than a percentage minimum value.

Figure 7:
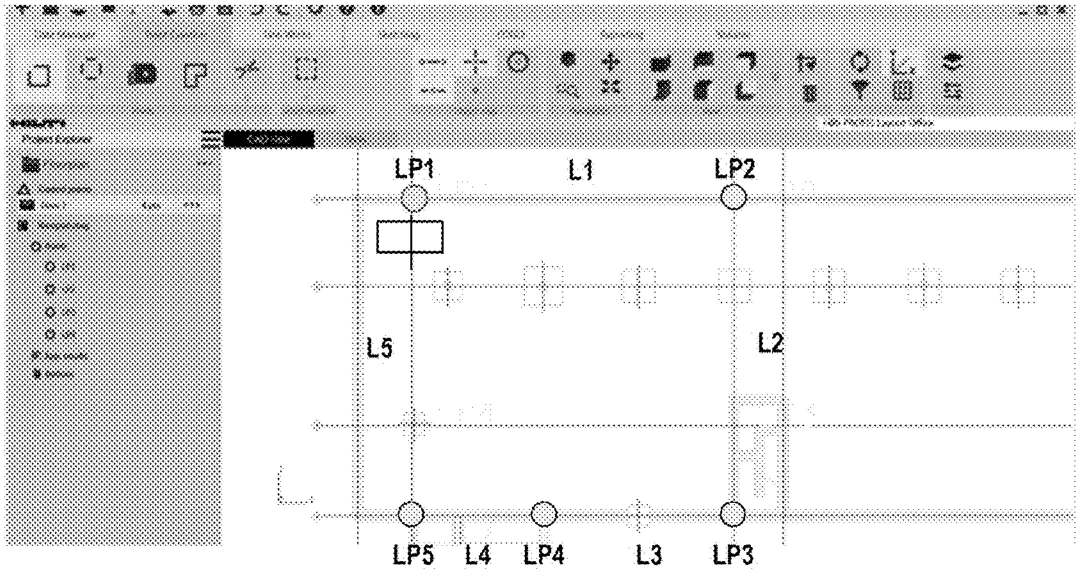
FIG. 7 shows a screenshot of the operating controller which shows how a polyline having an impermissible measuring area is created from the geometry model.

FIG. 7 shows a further screenshot of the operating controller 13, which shows an alternative polyline. The polyline of FIG. 7 is derived from the same geometry model of the measuring environment as the polyline of FIG. 5 and differs from the polyline of FIG. 5 in that an impermissible measuring area is defined.

An impermissible measuring area designates an area in which the geometry model deviates from the actual measuring environment and/or the area is inaccessible or unsuitable for a measurement using the measuring device 11. Examples of an impermissible measuring area can be door openings, window openings, glass panes, inaccessible areas.

The operator determines the first point LP1, the second point LP2, the third point LP3, and the fourth point LP4; in addition the operator determines a fifth point LP5, which is on the line between the third point LP3 and fourth point LP4. The microcontroller 84 defines the line between the first point LP1 and second point LP2 as the first line section L1, the line between the second point LP2 and third point LP3 as the second line section L2, a line between the third point LP3 and fifth point LP5 as the fourth line section L4; the line between the fourth point LP4 and fifth point LP5 is defined as an impermissible measuring area. The polyline is formed from the first line section L1, the second line section L2, the third line section L3 and the fourth line section LA.

The invention claimed is:

1. A method for computing a pose of a measuring device (11), which is set up in a measuring environment (12) having multiple delimitation surfaces (F-1, F-2, F-3, F-4) and which includes a distance measuring unit (42) having a measuring beam (26) and at least one angle measuring unit (43, 45), in a reference system of a geometry model, which maps at least the delimitation surfaces (F-1, F-2, F-3, F-4) of the measuring environment (12), by a microcontroller (84), which has a communicating connection to the measuring device (11) and which includes an algorithm for computing the pose, the method comprising the steps of:

creating a polyline from the geometry model, wherein the polyline represents a horizontal course of the delimitation surfaces (F-1, F-2, F-3, F-4) perpendicular to a direction of gravity (33) and comprises at least three line sections (LP1, LP2, LP3, LP4) (S10);

executing N, N≥4 measurements using the measuring device (11) in N different orientations of the measuring device (11), wherein the measuring beam (26) of the distance measuring unit (42) is incident in the N different orientations on at least two different delimitation surfaces (F-1, F-2, F-3, F-4) and defines N different measurement points (MP-1, MP-2, MP-3, MP-4, MP-5) and in each of the N orientations of the measuring device (11), a horizontal angle (HPhi-1, HPhi-2, HPhi-3, HPhi-4, HPhi-5) and a horizontal distance (HD-1, HD-2, HD-3, HD-4, HD-5) are determined between the respective measurement point and the measuring device (11) as measured values (S20); and executing the algorithm to compute the pose, wherein the algorithm comprises a sequence of at least four steps and the steps are selected from a first step, a second step, a third step, a fourth step, a fifth step, and a sixth step;

wherein:

(1) in the first step three measurement points of the N measurement points (MP-1, MP-2, MP-3, MP-4, MP-5) and three line sections of the polyline are selected and for a case in which no assignment between the measurement points (MP-1, MP-2, MP-3, MP-4, MP-5) and line sections (LP1, LP2, LP3, LP4) was carried out before a start of the algorithm, the selected three measurement points and selected three line sections are assigned to one another (S30);

(2) in the second step via measured values of the selected three measurement points and coordinates of the selected three line sections, a number of possible solutions for the pose of the measuring device (11) is determined (S40) and for a case that one solution or two solutions exist, measurement coordinates of at least two of the selected three measurement points are determined in the reference system of the geometry model;

(3) in the third step:

for a case that in the second step of the sequence no solution was determined (zero in S40), the method is continued with the sixth step of the sequence;

for a case that in the second step of the sequence a solution was determined (one in S40), an intermediate pose for the measuring device is computed from the measurement coordinates and measured values, measurement points of the N measurement points which meet a specified quality criterion are determined as qualified measurement points (S50), and the method is continued with the fifth step of the sequence;

for a case that in the second step of the sequence two solutions were determined (two in S40), a first test pose and a second test pose are computed from the measurement coordinates and measured values, for the first test pose and the second test pose in each case those measurement points of the N measurement points which meet a specified quality criterion are determined as first qualified measurement points or second qualified measurement points, respectively (S60), and the method is continued with the fourth step of the sequence;

(4) in the fourth step the first test pose and second test pose are compared with respect to their suitability on a basis of a specified comparison criterion (S70), wherein:

for a case that one of the first test pose and the second test pose is assessed as better suitable (I in S70), this test pose is defined as the intermediate pose (S80) and the method is continued with the fifth step of the sequence;

for a case that neither the first test pose nor the second test pose is assessed as better suitable (II in S70), the method is continued with the sixth step of the sequence;

(5) it is checked in the fifth step whether a pose is stored for the measuring device (S90), wherein:

for a case that no pose is stored for the measuring device (no in S90), the intermediate pose which was determined in the third step (S50) or the fourth step (S80) of the sequence is defined as the pose for the measuring device or an updated pose is computed with aid of the qualified measurement points and defined as the pose for the measuring device (S100) and the method is continued with the sixth step of the sequence;

for a case that a pose is stored for the measuring device (yes in S90), the intermediate pose which was determined in the third step (S50) or the fourth step (S60) of the sequence is compared on a basis of a specified further comparison criterion to the stored pose (S110), wherein for a case that the intermediate pose is assessed as better suitable (I in S110), the intermediate pose is defined as the pose or an updated pose is computed with aid of the qualified measurement points and defined as the pose for the measuring device (S120) and the method is continued with the sixth step of the sequence, and for a case that the intermediate pose is assessed as not better suitable (II in S110), the method is continued with the sixth step of the sequence; and (6) in the sixth step it is decided on a basis of a specified termination criterion whether a further sequence is carried out (S130), wherein:

for a case that a further sequence is carried out (I in S130), the method is continued with the first step of the sequence;

for a case that no further sequence is carried out and a pose is defined for the measuring device (II in S130), the method is ended;

for a case that no further sequence is carried out and no pose is defined for the measuring device (III in S130), the method is terminated without a pose having been computed for the measuring device.

2. The method as claimed in claim 1, wherein at least one of the following criteria is used as the quality criterion in the third step of the sequence: maximum distance of the measurement point to the polyline, unique assignment of the measurement point to a line section of the polyline, and maximum angle of incidence of the measuring beam to the line section of the polyline.

3. The method as claimed in claim 1, wherein at least one of the following criteria is used as the comparison criterion in the fourth step of the sequence: number of the qualified measurement points, distribution of the qualified measurement points along the polyline, surface area of the surface spanned by the qualified measurement points, and an estimated accuracy of a test pose.

4. The method as claimed in claim 1, wherein at least one of the following criteria is used as the further comparison criterion in the fifth step of the sequence: number of the qualified measurement points, distribution of the qualified measurement points along the polyline, surface area of the surface spanned by the qualified measurement points, and estimated accuracy of a pose.

5. The method as claimed in claim 1, wherein at least one of the following criteria is used as the termination criterion in the sixth step of the sequence: minimum number (M) of sequences, minimum number of qualified measurement points, percentage minimum value of the number of the qualified measurement points in relation to the number of the measurement points, absolute minimum value for the surface area of the surface spanned by the qualified measurement points, and a percentage minimum value of the surface area of the surface spanned by the qualified measurement points in relation to the surface area of the polygon which is enclosed by the polygon line.

6. The method as claimed in claim 1, wherein during the creation of the polyline, impermissible measuring areas are defined, wherein the line sections of the polyline assigned to the impermissible measuring areas are defined as impermissible line sections and are excluded from the selection of the three line sections in the first step of the sequence.

7. The method as claimed in claim 6, wherein at least one of the following measuring areas is defined as an impermissible measuring area: window opening, door opening, glass pane, area in which the geometry model deviates from the measuring environment (12), and area which is inaccessible or unsuitable for the measurement.

8. The method as claimed in claim 6, wherein the assignment to a line section which is different from an impermissible line section is used as a quality criterion in the third step of the sequence.

9. The method as claimed in claim 1, wherein the N measurements are executed manually by an operator using the measuring device (11) and the measurement points (MP-1, MP-2, MP-3, MP-4, MP-5) are assigned by the operator to the line sections of the polyline.

10. The method as claimed in claim 1, wherein the N measurements are executed by the microcontroller (84) using the measuring device (11) and the measurement points (MP-1, MP-2, MP-3, MP-4, MP-5) are assigned to the line sections of the polyline by the operator.

11. The method as claimed in claim 1, wherein the N measurements are executed manually by an operator using the measuring device (11) and the assignment to be performed in the first step of the sequence is performed by the microcontroller (84) randomly or with the aid of a selection criterion.

12. The method as claimed in claim 1, wherein the N measurements are executed by the microcontroller (84) using the measuring device (11) and the assignment to be performed in the first step of the sequence is performed by the microcontroller (84) randomly or with the aid of a selection criterion.

13. The method as claimed in claim 11, wherein at least one of the following criteria is used as the selection criterion: sequence of the line sections in the rotational direction of the measuring device (11), length of the line sections, and distances of the measurement points to the polyline, wherein the distances are computed with the aid of the measured values and a starting pose for the measuring device.

14. The method as claimed in claim 1, wherein the measuring device (11) includes a camera unit (47) and a camera image is created by the camera unit (47) in each of the N orientations of the measuring device (11) and wherein the camera image is assigned to the respective orientation of the measuring device (11).

* * * * *